United States Patent
Ackermann

(10) Patent No.: US 11,608,911 B2
(45) Date of Patent: Mar. 21, 2023

(54) METERING PRESSURE REGULATING VALVE

(71) Applicant: Pittway Sarl, Rolle (CH)

(72) Inventor: Michael Ackermann, Mosbach (DE)

(73) Assignee: Pittway Sarl, Rolle (CH)

( * ) Notice: Subject to any disclaimer, the term of this patent is extended or adjusted under 35 U.S.C. 154(b) by 0 days.

(21) Appl. No.: 16/878,349

(22) Filed: May 19, 2020

(65) Prior Publication Data

US 2021/0364100 A1   Nov. 25, 2021

(51) Int. Cl.
| | | |
|---|---|---|
| G05D 16/02 | (2006.01) | |
| F16K 37/00 | (2006.01) | |
| G05D 16/00 | (2006.01) | |

(52) U.S. Cl.
CPC ......... *F16K 37/005* (2013.01); *G05D 16/028* (2019.01)

(58) Field of Classification Search
CPC ........ G05D 16/028; F16K 37/005; G01F 1/88
See application file for complete search history.

(56) References Cited

U.S. PATENT DOCUMENTS

| | | | |
|---|---|---|---|
| 3,633,416 A | 1/1972 | Van Dyke | |
| 6,895,351 B2 * | 5/2005 | Grumstrup | G01F 1/24 |
| | | | 702/98 |
| D866,375 S | 11/2019 | Waters | |
| 2011/0137581 A1* | 6/2011 | Chung | G01F 15/061 |
| | | | 702/47 |
| 2014/0034145 A1* | 2/2014 | Burt | F24D 19/0095 |
| | | | 137/59 |
| 2016/0077531 A1* | 3/2016 | Kucera | F16K 37/0091 |
| | | | 137/2 |
| 2017/0218601 A1 | 8/2017 | Burrows | |
| 2019/0173302 A1 | 6/2019 | Waters et al. | |
| 2019/0265091 A1 | 8/2019 | Waters et al. | |
| 2020/0124759 A1* | 4/2020 | Sugiura | F16K 31/0672 |

FOREIGN PATENT DOCUMENTS

| | | |
|---|---|---|
| EP | 0767895 B1 | 1/1999 |
| EP | 1599773 B1 | 3/2018 |
| JP | H11175166 A | 7/1999 |
| JP | 3623125 B2 | 2/2005 |

OTHER PUBLICATIONS

International Search Report and Written Opinion of International Application No. PCT/EP2021/061491, dated Jul. 30, 2021, 14 pp.

* cited by examiner

*Primary Examiner* — Paul J Gray
(74) *Attorney, Agent, or Firm* — Greenberg Traurig, LLP; Ryan D. Sharp; David J. Dykeman

(57) ABSTRACT

In some examples, a pressure reducing valve includes a valve body defining a defining a flow path and a restricting element within the flow path. A sensing element is configured to modify a position of the restricting element in the flow path. The sensing element defines a first area in fluid communication with the flow path and a second area fluidly isolated from the flow path. The pressure reducing valve includes control circuitry configured to determine a differential pressure over a section of the flow path, determine a position of the restricting element, and determine a flow rate based on the differential pressure and the position of the restricting element.

20 Claims, 5 Drawing Sheets

METERING PRESSURE REGULATING VALVE

TECHNICAL FIELD

The disclosure relates to pressure regulating valves.

BACKGROUND

Pressure regulating devices are frequently used in industrial and residential systems designed to deliver fluid flows to one or more gaseous or liquid fluid loads. The pressure regulating devices may be employed to deliver or maintain the delivered fluid within predetermined pressure parameters selected based on, for example, system integrity, process controls, various equipment restrictions, and/or other reasons. Pressure regulating devices may operate by sensing pressure fluctuations and making corrective adjustments around a pressure setpoint. Such pressure regulating devices may be employed within fluid delivery systems to maintain pressures downstream of the device.

SUMMARY

In examples described herein, a pressure regulating valve is configured to control a fluid pressure in a fluid circuit, such as piping header in a fluid distribution system, by reducing the pressure of a higher pressure fluid using a restricting element. The pressure regulating valve defines a flow path through a flow area, through which fluid in the fluid circuit flows. The pressure regulating valve is configured to receive the higher pressure fluid and provide a lower pressure fluid to the fluid circuit. The pressure regulating valve is configured to adjust a position of a restricting element in the flow path as a function of the pressure in the fluid circuit. Thus, the pressure regulating valve is configured to control the pressure in the fluid circuit by at least modifying the flow area within the pressure regulating valve.

In some examples, the pressure regulating valve includes control circuitry configured to determine a differential pressure of the fluid flowing through the pressure regulating valve, and configured to determine a position of a restricting element within the pressure regulating valve. The pressure regulating valve is configured to determine a flow rate through the pressure regulating valve using the differential pressure and the position of the restricting element.

This disclosure also describes example techniques of using the pressure regulating valve to regulate a pressure.

In one example, this disclosure is directed to a valve comprising: a valve body defining a defining a flow path; a restricting element within the flow path; a sensing element configured to modify a position of the restricting element, wherein the sensing element defines a first area in fluid communication with the flow path and a second area fluidly isolated from the flow path; and control circuitry configured to: determine a differential pressure over a section of the flow path, determine the position of the restricting element, and determine a flow rate based on the differential pressure and the position of the restricting element.

In another example, the disclosure is directed to a valve comprising: a valve body defining a defining a flow path; a restricting element within the flow path; a sensing element operatively connected to the valve body, wherein the sensing element is configured to: move the restricting element in a first direction in response to a force on a first area of the sensing element, wherein the first area is in fluid communication with the flow path, and move the restricting element in a second direction different from the first direction in response to a force on a second area of the sensing element, wherein the second area is fluidly isolated from the flow path; and a control circuitry configured to: determine a differential pressure over a section of the flow path, determine a position of the restricting element, and determine a flow rate using the differential pressure and the position of the restricting element.

In another example, the disclosure is directed to a method including determining, by control circuitry, a differential pressure over a section of a flow path defined by a valve body of a valve; determining, by the control circuitry, a position of a restricting element of the valve, the restricting element being within the flow path, wherein the valve further comprises a sensing element configured to modify the position of the restricting element, wherein the sensing element defines a first area in fluid communication with the flow path and a second area fluidly isolated from the flow path; and determining, by the control circuitry, a flow rate based on the differential pressure and the position of the restricting element.

The details of one or more examples are set forth in the accompanying drawings and the description below. Other features, objects, and advantages will be apparent from the description and drawings, and from the claims.

DETAILED DESCRIPTION

Figure 1:
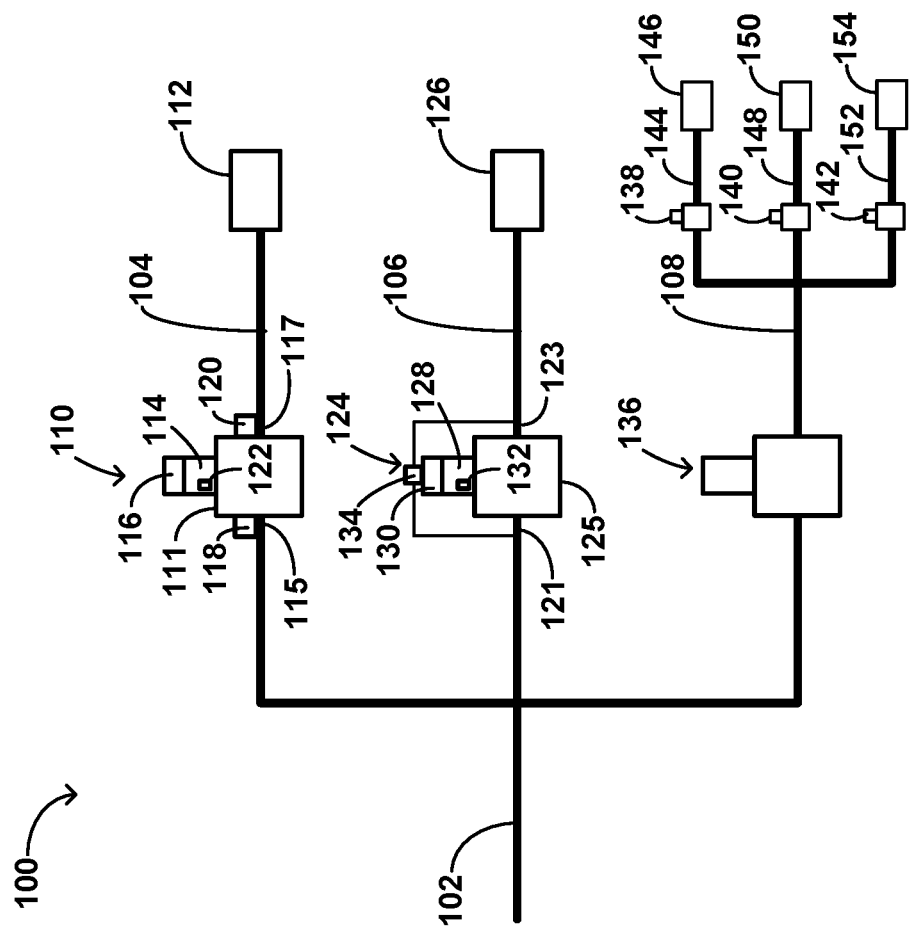
FIG. 1 is a conceptual diagram illustrating an example fluid system.

Pressure regulating valves are used in industrial and residential applications to control a pressure of a fluid in a fluid circuit. In some example systems, pressure regulating valves are situated between a main, higher pressure circuit and one or more branch, lower pressure circuits. The pressure regulating valve so situated may manipulate fluid flows provided from the main circuit in order to compensate for increases or decreases in demand by the one or more branch circuits, increases in the pressure of the main circuit, or some other load disturbance or combination of load disturbances.

For example, in some water distribution systems, pressure regulating valves may be used between a pumping station and a piping network serving consumers, in order to maintain a substantially constant water pressure in the piping network as demand among consumers fluctuates. As another example, in some natural gas delivery systems, pressure regulating valves may be used to reduce gas pressure from transmission pipelines to a distribution tap serving farm for a community. Within industrial settings such as chemical processing plants, oil refineries, and the like, pressure regulating valves may be used between multiple primary and secondary branch circuits in order to control various processes involving the precise control of one or more fluids, or to provide relatively steady-state pressures to, for example, air or water service branches which experience unpredictable, transitory demands. Because many end-user fluid demands require the fluid to be delivered to a secondary branch or maintained in a main branch in accordance with predetermined pressure parameters, pressure regulating valves are often employed to substantially maintain downstream pressures.

In addition to pressure reducing valves, fluid distribution systems often include additional components for metering. Metering is the practice of measuring fluid use. For example, water supplied by utilities to residential, commercial and industrial users may be metered. Metering may also be used to determine flow through a particular portion of a system which supplies fluid loads that may vary with time.

In examples described herein, a pressure regulating valve (PRV) is configured to allow a flow of a fluid through the PRV in order to substantially maintain the pressure at or near a pressure setpoint downstream of the PRV, while also determining a differential pressure and a valve position of the PRV. The PRV is configured to substantially maintain a fluid pressure in a branch circuit providing a fluid (e.g., water) to one or more fluid loads. In a residential setting, the one or more fluid loads can include, for example, a shower, a dishwasher, a washing machine, and the like. In order to adjust the fluid pressure in the branch circuit, the PRV may be configured to reposition a restricting element of the PRV as pressure increases or decreases in a branch circuit downstream of the PRV. The PRV is further configured to determine a differential pressure across the restricting element and a position of the restricting element in order to determine a flow rate through the PRV. The PRV is configured to meter a fluid based on the flow rate.

For example, the PRV may be configured to receive a higher pressure fluid at an inlet of the PRV, cause a pressure drop of the fluid using a restricting element (e.g., a valve disc), and provide a reduced pressure fluid to a fluid circuit in fluid communication with the pressure regulating valve outlet. The pressure drop caused by the PRV is dependent on a position of the restricting element within the PRV. As pressure in the fluid circuit varies (e.g., increases or decreases), the PRV senses the pressure and adjusts the position of the restricting element in order to increase or decrease the pressure drop caused as the fluid flows through the valve. For example, an increase in pressure at the PRV outlet may cause the PRV to adjust the restricting element position in a closing direction, increasing a pressure drop as the fluid flows through the PRV, and thus causing the pressure at the PRV outlet to decrease. A decrease in pressure at the PRV outlet may cause the PRV to adjust the restricting element position in an opening direction, decreasing the pressure drop as the fluid flows through the PRV, and thus causing the pressure at the PRV outlet to increase. Hence, by positioning the restricting element based on a pressure at the PRV outlet, the PRV adjusts the pressure drop of the fluid flowing within the PRV and acts to substantially maintain a pressure of the fluid provided to the fluid circuit.

The PRV is further configured to determine a flow rate through the PRV, and configured to provide an indication of the quantity of fluid flow through the valve over some period of time. For example, control circuitry of the PRV is configured to determine the flow rate using a differential pressure influenced by the pressure drop of the fluid flow through the PRV as well as the position of the restricting element within the PRV causing the pressure drop. The control circuitry can be configured to determine the differential pressure and the position of the restricting element using any suitable technique. For example, the PRV may include an inlet pressure sensor configured to generate and provide an inlet pressure signal indicative of the pressure at the inlet of the PRV to the control circuitry, and may include an outlet pressure sensor configured to generate and provide an outlet pressure signal indicative of the pressure at the out of the PRV to the control circuitry, and the control circuitry can be configured to determine the differential pressure based on the inlet pressure signal and the outlet pressure signal. In some examples, the PRV includes a valve position sensor (VPS) configured to generate and provide a valve position signal indicative of a position of the restricting element to the control circuitry. The control circuitry is configured to determine a flow rate through the PRV using the differential pressure and the valve position signal.

In some examples, the control circuitry may be configured to periodically determine the flow rate and integrate the flow rate over a period time in order to determine a volumetric amount of fluid which has passed through the PRV over the period of time. Thus, PRV may be configured to provide metering of a fluid flowing through the PRV, based on the position of the restricting element established by the PRV and the resulting pressure drop of the fluid flowing through the PRV.

In some examples, the PRV is configured to communicate with one or more user devices, such as a mobile phone, smartphone, tablet computer, personal computer, desktop computer, personal digital assistant, and the like. The PRV may communicate with the user device via a wired or wireless connection to the user device. The control circuitry of the PRV may exchange data with the user device, such as metering information (e.g., a consumption of fluid by a fluid system over a time interval), estimated costs of the metered flow, historical metering information (e.g., metered flow per day over a given week, etc.), error codes, and/or other operating parameters of the fluid system. In some examples, the user device includes control circuitry configured to control one or more parameters of the PRV. For example, in response to an inquiry from the control circuitry of the user device, the control circuitry of the PRV can provide fluid usage information for a user-selected time interval (e.g., a particular time of day, a particular day, days, one or more weeks, or one or more months) or other information regarding a user selected requested history of metered flow. In some examples, the control circuitry of the PRV provides metering information to an external computing system configured to monitor various operating parameters of a fluid system serving multiple fluid loads which actuate intermittently and independently. The external computing system may be configured to estimate an individual flow rate consumed by each individual fluid load based on an overall flowrate into the fluid system, and the PRV may provide metering information to the external computing system in order to, for example, increase an accuracy of the individual estimates.

In examples described herein, the PRV include a restricting element configured to help control flow from a higher pressure main circuit to a lower pressure branch circuit. The restricting element may comprise a valve member serving as a movable obstruction within a flow area of the PRV valve. The restricting element may comprise a valve disc, a valve spool, and/or some other movable obstruction which acts in combination with other components of the valve to provide a flow area. A fluid flowing through the PRV experiences a pressure decrease (e.g., head loss) as it proceeds through the PRV flow area due at least in part to the obstructing restricting element. The PRV may translate the restricting element to alter the spatial and/or obstruction characteristics of the flow area, which may alter the pressure loss experienced by the fluid as it travels through the PRV. Control of this pressure drop through the PRV allows control of a downstream pressure when the PRV bridges a higher pressure main circuit and a lower pressure branch circuit. The restricting element generating the fluid pressure loss may be, for example, a poppet valve, a needle valve, a gate valve, a globe valve, spool valve, or some other mechanism or combination of mechanisms. In some examples, the restricting element may be a double-ported valve.

The PRV is configured to position the restricting element using a sensing element within the body of the PRV. The sensing element is configured to sense the pressure at the PRV outlet and move (e.g., translate or flex) as the PRV outlet pressure varies. The sensing element may be operatively connected to the body of the PRV. For example, the sensing element may be a diaphragm or piston in fluid communication with a flow section at the PRV outlet, with the diaphragm or piston configured such that an increase in pressure at the PRV outlet causes movement (e.g., translation or flexing) in a first direction, and a decrease in pressure at the PRV outlet causes movement (e.g., translation or flexing) in a second direction substantially opposite the first direction. Movement of the sensing element in the first direction (e.g., when PRV outlet pressure increases) causes movement of the restricting element in a closing direction within the PRV, such that the pressure drop through the PRV increases and the PRV outlet pressure decreases. Movement of the sensing element in the second direction (e.g., when PRV outlet pressure decreases) causes movement of the restricting element in an opening direction within the PRV, such that the pressure drop through the PRV decreases and the PRV outlet pressure increases. In this way, the PRV is configured to sense pressure at the PRV outlet and adjust the position of the restricting element in response to changes in the PRV outlet pressure, in order to maintain a pressure in the fluid circuit supplied by the PRV.

The PRV is further configured to provide a reference force to the sensing element, such that the amount of sensing element movement generated during operation of the PRV is dependent on both the pressure at the PRV outlet and the reference force applied by the PRV to the sensing element. The magnitude of the reference force is substantially independent of a pressure of the fluid flowing through the PRV, such as at the PRV outlet pressure and the PRV inlet pressure. However, the magnitude of the reference force is dependent on a position and/or configuration of the sensing element. For example, the reference force may be applied via a reference force element, such as, but not limited to, a spring or a gas dome acting on the sensing element, with movement of the sensing element tending to compress or expand the spring or the gas in the gas dome. The compression or expansion of the reference force element based on the position and/or configuration of the sensing element thus acts to alter the reference force based on movement of the sensing element. Because movement of the sensing element also modifies the position of the restricting element with the PRV, the PRV is thus configured such that the position of the restricting element modifies the magnitude of the reference force.

The reference force element is configured to provide the reference force on the sensing element in a manner tending to cause the sensing element to move the restricting element in an opening direction, in order to counteract the tendency of the PRV outlet pressure to cause the sensing element to move the restricting element in a closing direction. In substantially steady-state operation, the PRV seeks a position for the sensing element (and thus the restricting element) which balances the reference force exerted on the sensing element by the reference force element and the pressure force exerted on the sensing element by the PRV outlet pressure. Thus, the PRV may be configured such that the reference force establishes the set point pressure the PRV seeks to maintain in the fluid circuit. The reference force may be adjustable (e.g., by adjusting a baseline displacement of the spring, or a pressure of a gas in the gas dome) to allow for adjustment of the set point pressure. The PRV can be configured such that the reference force can be adjusted manually by a user or automatically by control circuitry.

In examples, the PRV is a normally open valve employed to substantially maintain a downstream pressure. The PRV may be configured to operate toward or into a closed position (e.g., by at least decreasing the volume of the flow area) as the downstream pressure increases, and operate toward or into an open position (e.g., by at least increasing the volume of the flow area) as the downstream pressure decreases. In this manner, the PRV may be configured to respond to downstream pressure. Decreasing downstream pressures may be indicative of an increase in demand, prompting the PRV to operate toward or into an open position to allow more flow to a downstream branch circuit. On the other hand, increasing downstream pressures may be indicative of a decrease in demand, prompting the PRV to operate toward or into a closed position to provide less flow to the downstream branch circuit. By treating downstream pressure as a proxy for demand in this manner, the PRV may substantially match the fluid supply from a main circuit to the fluid demand generated in the branch circuit, while substantially maintaining a set pressure downstream of the PRV.

Here and elsewhere, "downstream" means the direction of a fluid flowing from a higher pressure area to a lower pressure area. "Upstream" denotes a direction opposite the downstream direction. For example, when a PRV is configured to provide flow from a higher pressure main circuit to a lower pressure branch circuit, a fluid flowing from the higher pressure main circuit to the lower pressure branch circuit flows in the downstream direction. The direction opposite the direction of fluid flow from the higher pressure main circuit to the lower pressure branch circuit is the upstream direction. Further, an "opening direction" denotes movement of a restricting element and/or a sensing element in a direction which alters the flow area to decrease the pressure loss experienced by a fluid traveling through the PRV. A "closing direction" denotes movement of a restricting element and/or sensing element in a direction which alters the flow area to increase the pressure loss experienced by a fluid traveling through the PRV.

FIG. 1 illustrates an example fluid system 100 including a main circuit 102 configured to provide a fluid (gas or liquid) to branch circuits 104, 106, and 108. Branch circuit 104 is configured to be supplied with a fluid from main circuit 102 via PRV 110, and configured to provide the fluid to fluid load 112. PRV 110 is configured to receive higher pressure fluid from, for example, main circuit 102, and supply the fluid at a lower pressure to branch circuit 104. PRV 110 includes valve body 111 configured to define a flow path from main circuit 102 to branch circuit 104, and includes a restricting element (not shown in FIG. 1) configured to alter a pressure of the fluid as it flow through the flow path defined by PRV 110. Branch circuit 104 is configured to provide the lower pressure fluid to fluid load 112.

Fluid load 112 may be a load intended to receive fluid at some secondary pressure below the supply pressure of the fluid provided by main circuit 102. For example, fluid load 112 might be a water or air connection intended to operate under relatively constant or transitory demand, where equipment and/or other considerations require that the air or water be provided at a lower pressure than that present within main circuit 102. Fluid load 112 might be, for example, a primary residential water connection, a water supply to a specific household appliance such as a water heater, a dishwasher, or a washing machine, a service air connection for the operation of air-driven tools, a pneumatic supply to some pneumatically operated system, a cooling water supply to specific equipment, or some other load intended to operate at pressures lower than that supplied by main circuit 102.

PRV 110 is configured to operate in accordance with a specific pressure setpoint, in order to maintain a substantially constant secondary pressure in branch circuit 104 as the main supply pressure of main circuit 102 varies and/or the fluid demand from fluid load 112 varies. For example, PRV 110 may be configured to maintain a secondary pressure in branch circuit 104 within 1% to about 30% of a setpoint pressure, such as within 30% of the pressure setpoint, within 20% of the pressure setpoint, within 10% of the setpoint pressure, within 5% of the setpoint pressure, or within 1% of the setpoint pressure.

PRV 110 includes a reference force element configured to impart a reference force (e.g., a pressure and/or force) to a sensing element (not shown in FIG. 1) within PRV 110. The reference force element may be included in a spring loaded, gas loaded, or gas and spring loaded dome, such as dome 114 in the example of FIG. 1. The sensing element may be configured such that some portion of the fluid flow proceeding through PRV 110 imparts a pressure generally counteracting the pressure and/or force imparted by the reference force element of dome 114. The sensing element is configured to translate in response to changes in the reference force of the reference force element, changes in the counter-acting pressure of the fluid flow through PRV 110, or changes to both. The translation of the sensing element alters the fluid flow characteristics of the flow through PRV 110 and acts to increase or decrease the pressure of branch circuit 104. Dome 114 may be configured such that the pressure and/or force imparted by the reference force element is adjustable, e.g., manually by a user or automatically by control circuitry of PRV 110 or another device. Adjustments to the reference force element may thus be utilized as a control for the pressure setpoint of branch circuit 104.

PRV 110 includes control circuitry 116 configured to determine a differential pressure over a section of the flow path defined by PRV 110. The differential pressure may be a pressure difference between an inlet pressure at a flow location upstream of the restricting element (either within PRV 110 or within main circuit 102) and an outlet pressure at a second flow location downstream of the restricting element (either within PRV 110 or within branch circuit 104). In some examples, the inlet pressure is indicative of a pressure at an inlet 115 of PRV 110 and the outlet pressure is indicative of a pressure at an outlet 117 of PRV 110. Control circuitry 116 may be configured to receive, from one or more sensors, a signal indicative of the inlet pressure and a signal indicative of the outlet pressure and determine the differential pressure using the indicative inlet pressure and the indicative outlet pressure signals. In some examples, control circuitry 116 is configured to receive a differential pressure signal reflecting the differential pressure between the inlet pressure and the outlet pressure.

Control circuitry 116 is further configured to determine a position of the restricting element within PRV 110. The position of the restricting element is indicative of the spatial and/or obstruction characteristics of the flow area within PRV 110 when the restricting element is in a given position. Control circuitry 116 can determine the position of the restricting element using any suitable technique, such as one or more of: based on sensing of an actual location of the restricting element, an integration of sensed movement of the restricting element, a position of a valve actuator and/or valve component coupled to the restricting element, or other suitable techniques. Control circuitry 116 is configured to determine a position of the restricting element over a range of PRV 110 positions between (and may include) PRV 110 fully shut and PRV 110 fully open. Control circuitry 116 may be configured to determine a position of the restricting element as a value within continuous data (e.g., any value within the range) or as a value within discrete data (e.g., one of a finite number of discrete values).

Control circuitry 116 is configured to determine a flow rate through PRV 110 using the differential pressure and the position of the restricting element. In some examples, control circuitry 116 is configured to determine the flow rate by at least evaluating an expression (e.g., a function) wherein a flowrate Q is proportional to the position of the restricting element and one or more of the differential pressure, the inlet pressure, or the outlet pressure.

Control circuitry 116 may be located adjacent or within a housing of PRV 110, or be positioned elsewhere within system 100. Further, although control circuitry of individual PRVs of system 100 are described herein and illustrated at FIG. 1, in some examples, one controller (including control circuitry) can determine an individual flow rate through an individual PRV for multiple PRVs. That is, system 100 can include one or more controllers configured to determine the flow rate through the PRV described herein. In some examples, control circuitry 116 is configured to periodically determine the flow rate and integrate the flow rate over a period time in order to determine a volumetric amount of fluid which has passed through the PRV over the period of time (e.g., to meter the fluid flow through PRV 110).

In some examples, PRV 110 is configured to sense the differential pressure. For example, PRV 110 may include an inlet pressure sensor 118 configured to provide an indication of a pressure upstream of the restricting element, such as an inlet pressure at the inlet of PRV 110 or elsewhere within main circuit 102. PRV 110 may include an outlet pressure sensor 120 configured to provide an indication of a pressure downstream of the restricting element, such as an outlet pressure at the outlet of PRV 110 or elsewhere within branch circuit 104. Inlet pressure sensor 118 and/or outlet pressure sensor 120 may be located adjacent or within a housing of PRV 110, or be positioned elsewhere within system 100.

Inlet pressure sensor 118 and outlet pressure sensor 120, as well as other pressure sensors described herein, can include any suitable pressure sensing circuitry and other structure configured to generate a signal indicative of the pressure at the sensing location. In some examples, inlet pressure sensor 118 and outlet pressure sensor 120 are components within a differential pressure sensor, and the differential pressure sensor includes suitable pressure sensing circuitry and other structure configured to generate a signal indicative of a difference in a pressure sensed by inlet pressure sensor 118 and a pressure sensed by outlet pressure sensor 120. Inlet pressure sensor 118 is configured to generate and provide to control circuitry 116 an inlet pressure signal indicative of a pressure at the inlet of PRV 110, and outlet pressure sensor 120 is configured to generate and provide to control circuitry 116 an outlet pressure signal indicative of a pressure at the outlet of PRV 110.

In some examples, PRV 110 is configured to sense the position of the restricting element. For example, PRV 110 may include a valve position sensor (VPS) 122 configured to generate and provide to control circuitry 116 a signal indicative of a position of the restricting element of PRV 110. VPS 122 includes any suitable configuration. In some examples, VPS 122 includes one or more reed switches, one or more limit switches, one or more potentiometer position sensors, 1 one or more linear variable differential transformer/voltage displacement (LVDT) transducers, one or more hall-effect magnetic sensors, and/or other proximity switches, and may include mechanically actuated components such as mechanical switches, mechanical counters, cams, actuating arms, and the like.

PRV 110 may receive a high pressure fluid from main circuit 102, reduce the pressure by positioning a restricting element relative to a flow path within the PRV 110, and supply a lower pressure fluid to branch circuit 104. PRV 110 acts to position the restricting element based on a balance between an outlet pressure acting on the sensing element and a reference force element acting on the sensing element. When the pressure in main circuit 102 and/or branch circuit 104 varies, PRV 110 repositions the restricting element to substantially maintain the pressure in branch circuit 104. Control circuitry 116 determines a differential pressure and a position of the restricting element, and determines a flow rate passing through PRV 110 using the differential pressure and the position of the restricting element. Control circuitry 116 may be configured to periodically determine the flow rate and integrate the flow rate over a period time in order to determine a volumetric amount of fluid which has passed through the PRV over the period of time (e.g., to meter the fluid flow through PRV 110).

System 100 may include additional branch circuits, such as branch circuit 106. Branch circuit 106 is configured to receive fluid from main circuit 102 via PRV 124 and provide fluid to fluid load 126. Fluid load 126 is a load intended to receive fluid at some particular pressure below the supply pressure of the fluid provided by main circuit 102. The particular pressure based on fluid load 126 may be greater, less than, or equal to the predetermined pressure based on fluid load 112. Correspondingly, a particular pressure setpoint of PRV 124 may be greater, less than, or equal to the specific pressure setpoint of PRV 110. PRV 124 is an example of PRV 110, and includes valve body 125, dome 128, control circuitry 130, and valve position sensor 132, which may be configured individually and in relation to each other in the same manner as that described for like named components of PRV 110.

PRV 124 also includes differential pressure detector 134. Differential pressure detector 134 is configured to determine a difference in pressure between a location upstream of the restricting element of PRV 124 (e.g., a pressure substantially at a valve inlet 121 of PRV 124) and a location downstream of the restricting element of PRV 124 (e.g., a pressure substantially at a valve outlet 123 of PRV 124). Differential pressure detector 134 includes control circuitry configured to determine the difference in pressure and communicate a signal indicative of the difference in pressure to control circuitry 130. In other examples, differential pressure detector 134 does not include control circuitry, but, rather, control circuitry 130 or other control circuitry of system 100 is configured to determine the difference in pressure.

System 100 may further include a branch circuit 108. Branch circuit 108 may receive fluid from main circuit 102 via PRV 136. PRV 136 may be an example of PRV 110 or PRV 124, and may substantially maintain an established pressure within branch circuit 108 as the main supply pressure of main circuit 102 and/or downstream fluid demands vary. PRV 136 may act as a primary pressure regulator and provide fluid at an established pressure to secondary pressure regulator 138, secondary pressure regulator 140, and secondary pressure regulator 142, each of which may be an example of PRV 110 and/or PRV 124. Secondary pressure regulator 138 may be configured to further reduce the pressure of the fluid within branch circuit 108 and provide fluid to tertiary branch 144 and fluid load 146. Secondary pressure regulator 140 may be configured to further reduce the pressure of the fluid within branch circuit 108 and provide the fluid to tertiary branch 148 and fluid load 150. Secondary pressure regulator 142 may be configured to further reduce the pressure of the fluid within branch circuit 108 and provide the fluid to tertiary branch 152 and fluid load 154. Fluid load 146, fluid load 150, and fluid load 154 may require fluid supplied at pressures less than fluid load 112 and/or fluid load 126, and secondary pressure regulator 138, secondary pressure regulator 140, and secondary pressure regulator 142 may be provided in order accomplish the additional pressure reduction in a more accurate manner based on, for example, a droop or other inaccuracy which may occur during operation of PRV 136. For example, PRV 136 might be used to reduce a main supply pressure of about 500 psi (4.35 megapascal) in main circuit 102 to a secondary pressure of about 100 psi (689 kilopascal (kPa)) in branch circuit 108, and secondary pressure regulators 138, 140, 142 might be used to reduce the secondary pressure of about 100 psi (689 kPa) in branch circuit 108 to a pressure less than about 25 psi (172 kPa).

Although PRVs 110, 124, 136, 138, 140, 142, are shown in FIG. 1, system 100 may include any suitable number of pressure regulating valves, and any number of main, branch, or otherwise designated fluid branches. The pressure regulating valves may be configured to receive a higher pressure fluid from a first branch and provide fluid to a second branch while substantially maintaining a pressure in the second branch. A PRV may supply any number of fluid loads and any number of fluid branches. For example, PRV 110 may supply one or more fluid loads in addition to fluid load 112 and one or more fluid branches in addition to branch circuit 104. A main, branch, or otherwise designated fluid branch may receive fluid from any number of upstream pressure regulating valves. Any number of pressure regulating valves may operate in in series or in parallel with any quantity of pressure regulating valves.

Figure 2:
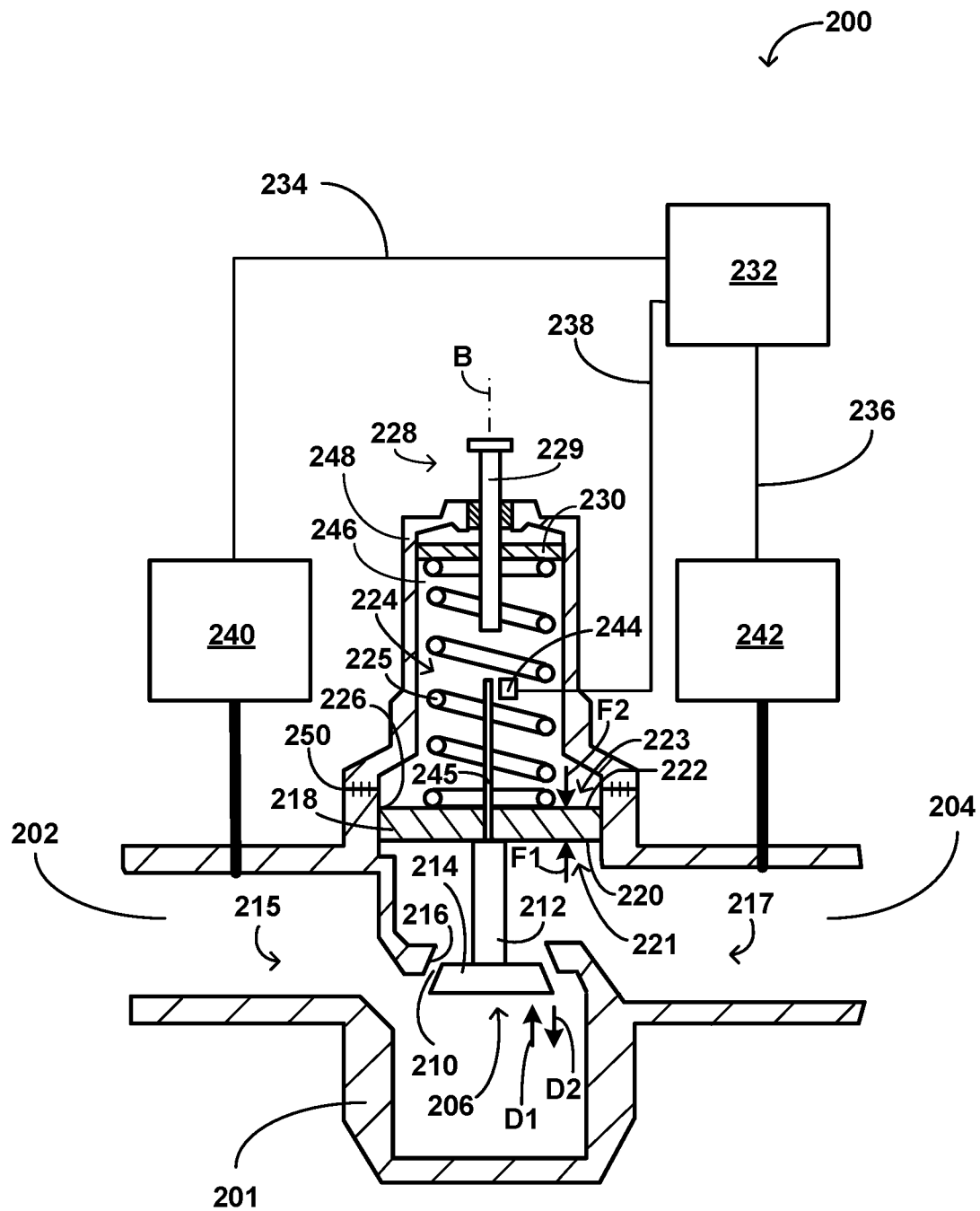
FIG. 2 is a conceptual diagram illustrating an example pressure regulating valve including a spring as a reference force element.

FIG. 2 illustrates an example PRV 200. PRV 200 includes valve body 201 defining PRV inlet 202 and PRV outlet 204. In FIG. 2, valve body 201 is illustrated in cross-section with a cutting plane parallel to the page. Valve body 201 is configured to define a flow path for a fluid between PRV inlet 202 and PRV outlet 204. For example, valve body 201 may define the flow path from PRV inlet 202, through flow area 210 between valve disc 214 and valve seat 216, and to PRV outlet 204. In some examples, PRV 200 is configured to receive a higher pressure fluid at PRV inlet 202 and regulate the fluid flow in order to provide fluid at a lower pressure at PRV outlet 204. For example, PRV 200 may be configured receive a higher pressure fluid from main circuit 102 and provide a lower pressure fluid to branch circuit 104, branch circuit 106, or branch circuit 108 (FIG. 1). Thus, PRV 200 is an example of any of the PRVs described with reference to FIG. 1 (e.g., PRV 110, PRV 124, PRV 136, PRV 138, PRV 140, and/or PRV 142).

In the example shown in FIG. 2, PRV 200 further comprises restricting element 206 including valve stem 212 and valve disc 214, flow area 210, high pressure side 215, valve seat 216, low pressure side 217, sensing element 218, first side 220 and first area 221 of sensing element 218, second side 222 and second area 223 of sensing element 218, reference force element 224, perimeter 226 of sensing element 218, reference force adjuster 228, bolt 229, spring plate 230, control circuitry 232, communication link 234, communication link 236, communication link 238, inlet pressure sensor 240, outlet pressure sensor 242, valve position sensor 244 ("VPS 244"), extension stem 245, enclosure 246 defined by valve body 201, and valve bonnet 248. In some examples, valve bonnet 248 is configured to be a separable portion of valve body 201. For example, valve bonnet 248 and/or valve body 201 may include threads 250 configured to allow separation of valve bonnet 248 from the remainder of valve body 201. Other configurations of valve bonnet 248 may be used in other examples.

The flow path defined by valve body 201 between PRV inlet 202 and PRV outlet 204 includes a flow area 210 within PRV 200, with a geometry of flow area 210 dependent in part on restricting element 206 and a volume (and/or area) of flow area 210 depending on a position of restricting element 206 within PRV 200. Restricting element 206 may comprise, for example, valve stem 212 mechanically coupled to valve disc 214. Flow area 210 is defined by any suitable structures within PRV 200. In some examples, as shown in FIG. 2, flow area 210 is at least partially bounded by valve disc 214 and valve seat 216. PRV 200 is configured to allow for restricting element 206 to translate and alter flow area 210. The alteration of flow area 210 may alter the pressure drop a fluid flow experiences between PRV inlet 202 and PRV outlet 204, allowing for the regulation of a fluid flow between PRV inlet 202 and PRV outlet 204.

PRV 200 is configured such the flow path between PRV inlet 202 and PRV outlet 204 encounters restricting element 206 between PRV inlet 202 and PRV outlet 204. Valve body 201 may be configured to define a high pressure side 215 of PRV 200 and a low pressure side 217 of PRV 200. High pressure side 215 includes those portions of valve body 201 configured to be in fluid communication with a fluid flowing from PRV inlet 202 to PRV outlet 204 and upstream of restricting element 206. Low pressure side 217 includes those portion of valve body 201 configured to be in fluid communication with a fluid flowing from PRV inlet 202 to PRV outlet 204 and downstream of restricting element 206. PRV 200 may be configured receive a higher pressure fluid from main circuit 102 (FIG. 1) using high pressure side 215 and provide a lower pressure fluid to branch circuit 104, branch circuit 106, or branch circuit 108 using low pressure side 217 (FIG. 1).

PRV 200 further includes a sensing element 218. In FIG. 2, sensing element 218 is illustrated in cross-section with a cutting plane parallel to the page. Sensing element 218 is configured to modify the position of restricting element 206 relative to valve body 201. For example, sensing element 218 may be mechanically coupled to restricting element 206. In examples, sensing element is mechanically coupled to valve stem 212 of restricting element 206. Sensing element 218 includes a first side 220 defining a first area 221 and a second side 222 defining a second area 223. First side 220 is configured such that first area 221 is in fluid communication with a flow section of the flow path between PRV inlet 202 and PRV outlet 204. In examples, first area 221 is in fluid communication with some portion of low pressure side 217 of PRV 200. Second side 222 is configured such that second area 223 is fluidly isolated from those portions of valve body 201 configured to be in fluid communication with a fluid flowing from PRV inlet 202 to PRV outlet 204.

Sensing element 218 is configured to experience motion (e.g., relative to valve body 201) based on a difference between a first force F1 on first side 220 and a second force F2 acting in a direction opposite first force F1. Force F1 may arise from a pressure acting on first side 220 (e.g., on or over first area 221), such as a pressure of a fluid within low pressure side 217 of PRV 200. Force F2 may arise from a reference force element 224 transmitting a reference force to second side 222. In FIG. 2, PRV 200 is configured to include a spring 225 as reference force element 224. Spring 225 is configured to exert a reference force on sensing element 218 which opposes first force F1. In other examples, however, reference force element 224 can include other configurations, such as the gas dome described with reference to FIG. 1.

In examples, reference force element 224 (e.g., spring 225) is configured to exert a force on sensing element 218 in a direction causing restricting element 206 to move in an opening direction. In this way, PRV 200 may be configured such that a fluid pressure within low pressure side 217 acts to exert a force (e.g., F1) on sensing element 218 tending to cause movement of restricting element 206 in a closing direction while reference force element 224 (e.g., spring 225) exerts a force (e.g., F2) on sensing element 218 tending to cause movement of restricting element 206 in an opening direction. In a substantially steady-state operation. PRV 200 may be configured such that restricting element 206 substantially establishes flow area 210 based on the force F1 tending to cause restricting element 206 to move in the closing direction and the force F2 tending to cause restricting element 206 to move in the opening direction.

In some examples, sensing element 218 comprises a diaphragm or a piston having first side 220 and second side 222. Sensing element 218 may define a perimeter 226 surrounding a portion of sensing element 218. Sensing element 218 may be mechanically coupled and/or fixably attached to valve body 201 of PRV 200 around all or some part of perimeter 226. For example, sensing element 218 may be a particular diaphragm defining a perimeter 226 and fixably attached to valve body 201 around the entirety of perimeter 226. Sensing element may be a piston with perimeter 226 slidably translatable over some portion of valve body 201.

As discussed, sensing element 218 may move based on a difference between a first force F1 acting on first side 220 and a second force F2 acting in a direction opposite first force F1 (e.g., a reference force from a reference force element such as spring 225). The first force F1 on first side 220 may arise from the fluid pressure of a fluid within low pressure side 217 acting over first area 221, as well as from flow sections within the flow path which encounter restricting element 206. Hence, increases or decreases in the fluid pressure within low pressure side 217 may act to alter the force F1, causing motion of sensing element 218. Motion of sensing element 218 causes motion of restricting element 206 and adjustment of flow area 210. Adjusting flow area 210 adjusts a pressure drop of fluid flow through flow area 210. "Adjustment" to flow area 210 can refer to the adjustment to a size of flow area, such as an adjustment to a volume of flow area 210. By adjusting positioning restricting element 206 to adjust flow area 210 in this manner, PRV 200 may substantially maintain the fluid pressure within a branch circuit supplied by PRV outlet 204.

For example, when PRV 200 is supplying a branch circuit and fluid load (e.g., branch circuit 104 and fluid load 112 (FIG. 1)), an increase in fluid demand from the fluid load (e.g., fluid load 112) may act to decrease fluid pressure in the branch circuit (e.g., branch circuit 104). With PRV outlet 204 providing fluid to the branch circuit, the decrease in fluid pressure in the branch circuit acts to decrease a fluid pressure within low pressure aide 217 of PRV 200. The decrease in fluid pressure within low pressure side 217 acts to decrease the fluid pressure acting on first area 221, decreasing the first force F1 and causing sensing element 218 to reposition restricting element 206 in a manner that decreases a pressure drop of the fluid as it flows through flow area 210 (e.g., sensing element 218 repositions restricting element 206 in an opening direction such as D2 to increase flow area 210). The decreased pressure loss through flow area 210 causes an increase in the fluid pressure within low pressure side 217 of PRV 200, increasing the pressure in the branch circuit. In this way. PRV 200 may act to substantially maintain a setpoint pressure within a branch circuit (e.g., branch circuit 104) when fluid demand from a fluid load (e.g., fluid load 112) increases. In some examples, "substantially maintaining" a pressure described herein can include, for example, maintaining the pressure within 1%-10% of a particular pressure value, such as within 1%, 2%, 3%, 4%, 5% or 10% of the particular pressure value.

When PRV 200 is supplying the branch circuit and fluid load (e.g., branch circuit 104 and fluid load 112 (FIG. 1)), a decrease in fluid demand from the fluid load (e.g., fluid load 112) may act to increase fluid pressure in the branch circuit (e.g., branch circuit 104). When PRV outlet 204 is providing fluid to the branch circuit, the increase in fluid pressure in the branch circuit acts to increase a fluid pressure within low pressure aide 217 of PRV 200, increasing the first force F1 and causing sensing element 218 to reposition restricting element 206 in a closing direction D1. This decreases flow area 210 and increases a pressure drop of the fluid as it flows through flow area 210. The increased pressure loss through flow area 210 causes a decrease in the fluid pressure within low pressure side 217 of PRV 200, decreasing the pressure in the branch circuit. In this way, PRV 200 may act to substantially maintain a setpoint pressure within a branch circuit (e.g., branch circuit 104) when fluid demand from a fluid load (e.g., fluid load 112) decreases.

In this manner PRV 200 may regulate a flow from PRV inlet 202 to PRV outlet 204 to substantially maintain a fluid pressure downstream of flow area 210, based on a force differential across sensing element 218. For example, PRV 200 may maintain the downstream fluid pressure within at least 1% to about 30% of a setpoint pressure, such as at within about 1%, 5%, 10%, 20%, or 30% of the setpoint pressure.

The setpoint pressure may be adjusted by adjusting the reference force imparted on sensing element 218 by the reference force element 224 (e.g., spring 225 in the example of FIG. 2). For example, PRV 200 includes a reference force adjuster 228 configured to adjust the reference force imparted by the reference force element 224 on sensing element 218. As depicted in FIG. 2, reference force adjuster 228 includes a bolt 229 configured to translate spring plate 230. Spring plate 230 is configured to substantially establish a compression of spring 225 based on a position of spring plate 230 within PRV 200. In an example, rotation of bolt 229 about bolt axis B in a first direction displaces spring plate 230 in a direction increasing the compression of spring 225 (e.g., displaces spring plate 230 toward sensing element 218), and increasing the reference force imparted by spring 225 on sensing element 218. Rotation of bolt 229 about bolt axis B in a second direction opposite the first direction displaces spring plate 230 in a direction decreasing the compression of spring 225 (e.g., displaces spring plate 230 away from sensing element 218), and decreasing the reference force imparted by spring 225 on sensing element 218. Alteration of the reference force imparted to sensing element 218 acts to alter the second force F2, allowing for adjustment of the setpoint pressure substantially maintained by PRV 200. In examples, reference force adjuster 228 can be manually adjusted by a user with or without a tool, and/or may be automatically adjusted by control circuitry 232. As will be discussed, bolt 239 and spring plate 230 are one example of reference force adjuster 228. Other reference force adjusters configured to adjust the reference force element may be used in other examples.

As discussed, variations in fluid demand by a fluid load downstream of PRV 200 causes PRV 200 to alter flow area 210, in order to substantially maintain fluid pressure within low pressure side 217 in accordance with a pressure setpoint. In addition to altering the fluid pressure within low pressure side 217, alterations to flow area 210 additionally impact the rate of flow through PRV 200. For example, when PRV 200 positions restricting element 206 in the opening direction to increase fluid pressure within low pressure side 217, flow rate through PRV 200 increases. When PRV 200 positions restricting element 206 in the closing direction to decrease fluid pressure within low pressure side 217, flow rate through PRV 200 decreases. Hence, the flow rate provided to a branch circuit (e.g., branch circuit 104, 106, 108 and/or tertiary branch 144, 148, 152) by PRV 200 varies as PRV 200 repositions restricting element 206 to maintain setpoint pressures during changes in fluid demands from a fluid load (e.g., fluid load 112, 126, 146, 150, 154).

Control circuitry 232 of PRV 200 or otherwise in communication with PRV 200 is configured to determine a flow rate passing from PRV inlet 202 to PRV outlet 204 as restricting element 206 is repositioned to meet altered fluid demands. Control circuitry 232 is configured to determine the flow rate by at least determining a differential pressure across PRV 200 and a position of restricting element 206 within PRV 200. The differential pressure may be difference between a pressure upstream of restricting element 206 (e.g., a pressure within high pressure side 215) and a pressure downstream of restricting element 206 (e.g., a pressure within low pressure side 217). The position of restricting element 206 within PRV 200 may be a position of restricting element 206 relative to some reference position (e.g., fully open or fully closed).

In examples, control circuitry 232 is configured to determine the flow rate passing from PRV inlet 202 to PRV outlet 204 by at least evaluating an expression (e.g., a function) wherein a flowrate Q is proportional to the position of restricting element 206 (e.g., relative to valve body 201) and one or more of the differential pressure, the inlet pressure (e.g., a pressure at PRV inlet 202), or the outlet pressure (e.g., a pressure at PRV outlet 204). The expression may, for example, have a form $Q=f(P, V)$, where P is a parameter based on a pressure upstream of restricting element 206, a pressure downstream of restricting element 206, and/or a differential pressure across restricting element 206, and V is a parameter based on a position of restricting element 206. The parameters P and V may be bases in respective exponentiations, any may each have any positive or negative exponent. The expression may include continuous and/or discontinuous functions. In some examples, control circuitry 232 is configured to select an expression from among one or more predetermined expressions (e.g., stored in a memory accessible to control circuitry 232) based on the values of an inlet pressure, an outlet pressure, a differential pressure, and/or a valve position. For example, control circuitry 232 may be configured to utilize a first expression Q1 to determine a flow rate when the inlet pressure, the outlet pressure, the differential pressure, and/or the valve position is a value within a first interval, and utilize a second expression Q2 to determine a flow rate when the inlet pressure, the outlet pressure, the differential pressure, and/or the valve position is a value within a second interval.

In some examples, control circuitry 232 is configured to determine the flow rate passing from PRV inlet 202 to PRV outlet 204 using a look-up data set defining flow rates as multi-dimensional point data. The look-up data set can be stored in a memory accessible to control circuitry 232. For example, the look-up data set might define flow rate values in an n-dimensional space having individual dimensions defined by the inlet pressure, the outlet pressure, the differential pressure, the valve position, and/or combinations thereof. Control circuitry 232 may be configured to determine at least an inlet pressure, an outlet pressure, a differential pressure, and/or a valve position and determine a flow passing from PRV inlet 202 to PRV outlet 204 using the look-up data set.

In some examples, control circuitry 232 is configured determine a quantity of fluid flow (e.g., a volume) through PRV 200 over a particular time interval. For example, control circuitry 232 may integrate the flow rate passing from PRV inlet 202 to PRV outlet 204 over a time interval to determine a quantity of fluid flow (e.g., a volume) which occurred over the time interval. Control circuitry 232 may determine the flow volume by substantially integrating the flow rate with respect to time, or by conducting a numerical integration using discrete time intervals. For example, control circuitry 232 may be configured to determine a flow rate every 0.1 seconds and determine a corresponding flow volume integrating the flow rate over a 0.1 second time interval. Control circuitry 232 may provide the flow volume as an output. For example, control circuitry 232 may provide the flow volume over a single discrete time interval (e.g., over the 0.1 seconds), or provide the flow volume over multiple discrete time intervals. For example, control circuitry 232 may be configured to provide a flow volume which has occurred over a minute, an hour, a day, a week, or some other time period, based on a series of flow rates determined at discrete time intervals less than a minute.

Thus, PRV 200 is configured to determine a volume of fluid supplied to a branch circuit (e.g., branch circuit 104, 106, and/or 108, and/or tertiary branch 144, 148, and/or 152) as PRV 200 repositions restricting element 206 in response to changes in fluid demands from a fluid load (e.g., fluid load 112, 126, 146, 150, and/or 154).

Control circuitry 232 is configured to determine a differential pressure over a section of a flow path at least partially defined by valve body 201. The differential pressure may be, for example, a pressure difference between an inlet pressure and an outlet pressure, where the inlet pressure is indicative of a pressure at PRV inlet 202 (e.g., a pressure upstream of restricting element 206) and the outlet pressure is indicative of a pressure at PRV outlet 204 (e.g., a pressure downstream of restricting element 206). In some example, the differential pressure is a pressure difference between a pressure within high pressure side 215 and a pressure within low pressure side 217 of PRV 200.

Control circuitry 232 can determine the inlet pressure and the outlet pressure of PRV 200 using any suitable technique. In some examples, control circuitry 232 is configured to receive an inlet pressure signal generated by a first sensor and indicative of the inlet pressure and an outlet pressure signal generated by a second sensor and indicative of the outlet pressure and determine the differential pressure using the inlet pressure signal and the outlet pressure signals. In some examples, control circuitry 232 is configured to receive the inlet pressure signal from inlet pressure sensor 240 via communication link 234 and receive the outlet pressure signal from outlet pressure sensor 242 via communication link 236.

Control circuitry 232 can determine a position of restricting element 206 within PRV 200 using any suitable technique. In some examples, control circuitry 232 is configured to receive a signal indicative of the position of restricting element 206 relative to a reference point, e.g., on valve body 201, from VPS 244 via communication link 238 and determine the position of restricting element 206 based on the received signal.

Control circuitry 232, as well as other control circuitry described herein including control circuitry 116 of FIG. 1, can comprise any suitable arrangement of hardware, software, firmware, or any combination thereof, to perform the techniques attributed to control circuitry 232 herein. For example, control circuitry 232 may include any one or more microprocessors, digital signal processors (DSPs), application specific integrated circuits (ASICs), field programmable gate arrays (FPGAs), or any other equivalent integrated or discrete logic circuitry, as well as any combinations of such components.

Communication link 234, communication link 236, communication link 238, a well as other communication links described herein may be hard-line and/or wireless communications links. In some examples, communication link 234, communication link 236, and/or communication link 238 may comprise some portion of control circuitry 232. Communication link 234, communication link 236, and/or communication link 238 may comprise a wired connection, a wireless Internet connection, a direct wireless connection such as wireless LAN, Bluetooth™, Wi-Fi™, and/or an infrared connection. Communication link 234, communication link 236, and/or communication link 238 may utilize any wireless or remote communication protocol.

Control circuitry 232 may be located adjacent to or within some enclosure defined by valve body 201, or may be within a controller housing configured to remain separate from valve body 201. Additionally, control circuitry 232 may be configured to determine a flow rate for PRVs in addition to PRV 200. Control circuitry 232 may be configured to periodically determine the flow rate and integrate the flow rate over a period time in order to determine a volumetric amount of fluid which has passed through PRV 200 over the period of time (e.g., to meter the fluid flow through PRV 200).

As discussed above, in some examples, control circuitry 232 is configured to determine the differential pressure using one or more pressure sensors. For example, in FIG. 2, PRV 200 includes an inlet pressure sensor 240 configured to generate a signal indicative of a pressure within high pressure side 215 of PRV 200, and an outlet pressure sensor 242 configured to generate a signal indicative of a pressure within low pressure side 217 of PRV 200. Inlet pressure sensor 240 and/or outlet pressure sensor 242 may be located adjacent to or within some enclosure defined by valve body 201, or may be within a sensor housing configured to remain substantially separate from valve body 201. In some examples, inlet pressure sensor 240 and outlet pressure sensor 242 are components within a differential pressure sensor configured to provide a signal indicative of a difference in a pressure sensed by inlet pressure sensor 240 and a pressure sensed by outlet pressure sensor 242.

Inlet pressure sensor 240 may be configured to generate a signal as a function of a pressure imposed on some portion of inlet pressure sensor 240. Outlet pressure sensor 242 may be configured to generate a signal as a function of a pressure imposed on some portion of outlet pressure sensor 242. Inlet pressure sensor 240 and/or outlet pressure sensor 242 may be configured to use any type of force collector to sense the outlet pressure, including, for example, diaphragms, pistons, bourdon tubes, bellows, or some other collector. Inlet pressure sensor 240 and/or outlet pressure sensor 242 may transduce the pressure into an electrical signal using, for example, piezoresistive strain gauges, capacitors, electromagnets, optical fibers, potentiometric wipers, or other devices. In some examples, inlet pressure sensor 240 and/or outlet pressure sensor 242 may be configured to sense an absolute pressure or a gauge pressure.

Signals indicative of a pressure generated by inlet pressure sensor 240 (e.g., a pressure within high pressure side 215) and/or outlet pressure sensor 242 (e.g., a pressure within low pressure side 217) may be an analog electrical signal or a digital signal. In some examples, inlet pressure sensor 240 and/or outlet pressure sensor 242 may include processing circuitry configured to interpret a response of its respective force collector and generate the signal indicative of the pressure, and/or control circuitry 232 may be configured to interpret a response of the respective force collector and generate the signal indicative of the pressure. Inlet pressure sensor 240 and/or outlet pressure sensor 242 may be configured to provide a signal indicative of the pressure to other devices in data communication with inlet pressure sensor 240 and/or outlet pressure sensor 242.

As discussed above, control circuitry 232 is configured to determine the position of restricting element 206. For example, in FIG. 2, PRV 200 includes VPS 244 configured to generate and provide a signal indicative of a position of restricting element 206 within PRV 200. VPS 244 may include any suitable valve position indicating circuitry and other structure configured to generate a signal indicative of a valve position of restricting element 206 within PRV 200. VPS 244 is configured to provide the signal indicative of the position of restricting element 206 to control circuitry 232 or another device via communication link 238. VPS 244 may include, for example, a linear variable differential transformer (LVDT), a rotational variable differential transformer (RVDT), a potentiometer, piezoelectric sensors, optical sensors, inductive sensors, magnets, reed switches, hall-effect magnetic sensors, reed switches, and/or other proximity switches, and may include mechanically actuated components such as mechanical switches, mechanical counters, cams, actuating arms, and the like.

VPS 244 may be configured to sense a position of any component within PRV 200 having a position related to the position of restricting element 206. For example, VPS 244 may be configured to sense a position of valve stem 212, valve disc 214, sensing element 218, and other components of PRV 200 having a position which influences the position of restricting element 206. In some examples, PRV 200 includes an extension stem 245 mechanically connected to valve stem 212, valve disc 214, sensing element 218, or another components of PRV 200, and VPS 244 is configured to sense a position of extension element 245 relative to some point on valve body 201. Extension stem 245 may be configured to extend at least partially into enclosure 246 defined by bonnet 248, in order to, for example, allow VPS 244 to sense the position of restricting element 206 in a location fluidly isolate from a fluid flowing within PRV 200.

In some examples, VPS 244 includes processing circuitry configured to generate a signal indicative of the position of restricting element 206, and/or control circuitry 232 may be configured to interpret a response of VPS 244 and determine the position of restricting element 206. VPS 244 may be configured to provide the signal indicative of the position of restricting element 206 to other devices in data communication with VPS 244. VPS 244 may be fluidly isolated from the flow path defined by PRV 200, in order to increase accessibility, simplify and/or improve communications with control circuitry 232, or for other reasons. In some examples, VPS 244 is located within enclosure 246 defined by valve body 201 (e.g., within valve bonnet 248).

Figure 3:
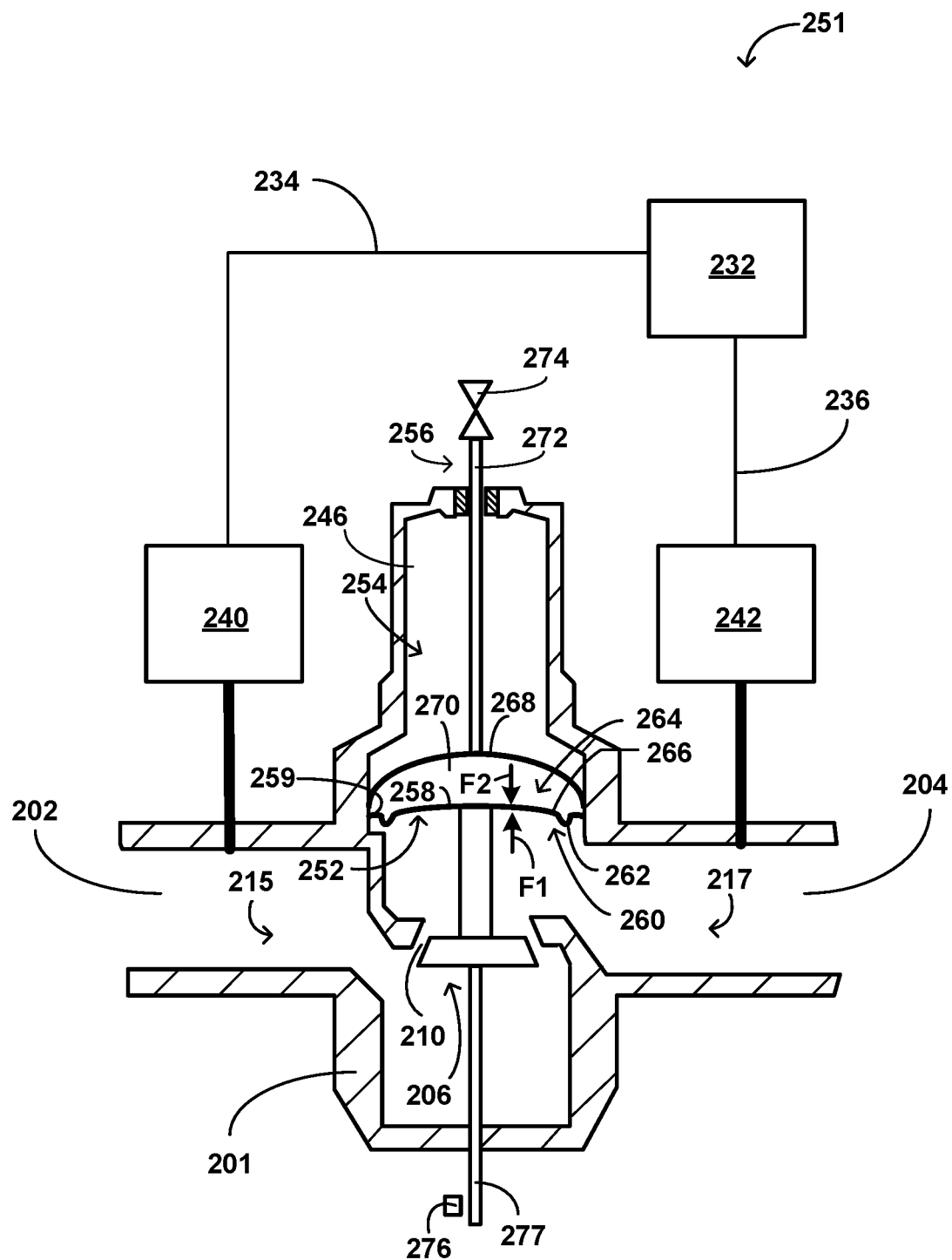
FIG. 3 is a conceptual diagram illustrating an example pressure regulating valve including a gas dome as a reference force element.

FIG. 3 illustrates an example PRV 251, which is configured to receive a higher pressure fluid at PRV inlet 202 and regulate the fluid flow in order to provide fluid at a lower pressure at PRV outlet 204. For example, PRV 251 may be configured receive a higher pressure fluid from main circuit 102 and provide a lower pressure fluid to branch circuit 104, branch circuit 106, or branch circuit 108 (FIG. 1). Thus, PRV 251 is an example of PRV 110, PRV 124, PRV 136, PRV 138, PRV 140, PRV 142, and/or PRV 200.

PRV 251 includes valve body 201, PRV inlet 202. PRV outlet 204, restricting element 206, flow area 210, high pressure side 215, low pressure side 217, control circuitry 232, communication link 234, communication link 236, inlet pressure sensor 240, outlet pressure sensor 242, and valve bonnet 248. PRV 251 further includes sensing element 252, reference force element 254, and reference force adjuster 256. Sensing element 252 is an example of sensing element 218 (FIG. 2), reference force element 254 is an example of reference for element 224, and reference force adjuster 256 is an example of reference force adjuster 228. PRV 251 is similar to PRV 200 of FIG. 2 but includes a different reference force element 254.

Sensing element 252 includes diaphragm 258 configured to modify the translation of restricting element 206 relative to valve body 201. Diaphragm 258 includes a first side 260 defining a first area 262 and a second side 264 defining a second area 266. Sensing element 252 is configured to move in response to a difference between a first force F1 on first side 260 and a second force F2 acting in a direction opposite first force F1. Force F1 may arise from a pressure acting on first side 260, such as a pressure of a fluid flowing through valve body 201 and within low pressure side 217 acting on first area 262. Force F2 may arise from reference force element 254 transmitting a reference force to second side 264. First side 260 is an example of first side 220 (FIG. 2), first area 262 is an example of first area 221, second side 264 is an example of second side 222, and second area 266 is an example of second area 266.

In FIG. 3, reference force element 254 includes a dome 268 defining dome chamber 270. Dome 268 is configured to cause a compressible gas (e.g., air) within dome chamber 270 to exert a reference force on diaphragm 258. PRV 251 is configured such that a fluid pressure within low pressure side 217 of PRV 251 acts to exert a force (e.g., F1) on sensing element 252 (e.g., on second side 264 of diaphragm 258) which tends to cause movement of restricting element 206 in a closing direction, while reference force element 254 (e.g., dome 268) causes a force (e.g., F2) on sensing element 252 tending to cause movement of restricting element 206 in an opening direction. Diaphragm 258 may be configured to bend or flex in response to force F1 and/or force F2, such that the bending or flexing causes movement of restricting element 206. For example, diaphragm 258 may define perimeter 259 surrounding diaphragm 258, with perimeter 259 mechanically coupled and/or fixably attached to valve body 201 around all or some part of perimeter 226. In like manner to that described for PRV 200, motion of sensing element 252 (e.g., diaphragm 258) causes motion of restricting element 206 and adjustment of flow area 210. Adjusting flow area 210 adjusts a pressure drop of fluid flow through flow area 210.

Dome 268 may be configured such that a gas in dome chamber 270 is in fluid communication with second side 264 of diaphragm 258. Dome 268 may be configured such that the gas in dome chamber 270 is in fluid communication with second area 266 and exerts a gas pressure on second area 266. Diaphragm 258 may be configured such that the exertion of the gas pressure on second area 266 causes the reference force (e.g., F2) to act on the second side 264 of diaphragm 258. In some examples, dome 268 is configured to cause the gas in dome chamber 270 to exert a pressure a portion of dome 268 coupled to diaphragm 258 (e.g., a dome plate (not shown)), and dome 268 is configured to transmit the reference force caused by the gas in dome chamber 270 to the second side 264 of diaphragm 258.

The setpoint pressure for PRV 251 may be adjusted by adjusting the reference force imparted on sensing element 252 using reference force adjuster 256. For example, a gas pressure within dome chamber 270 may be increased or decreased in order to adjust the setpoint pressure. In the example of FIG. 3, PRV 251 includes a conduit 272 in fluid communication with dome chamber 270 and configured to increase and/or decrease a gas pressure in dome chamber 270. Reference force adjuster 256 further includes a dome valve 274 having an open position allowing a gas to flow through conduit 272 either into dome chamber 270 to increase a gas pressure in dome chamber 270, or from dome chamber 270 to decrease a gas pressure in dome chamber 270. Alteration of a pressure within dome chamber 270 alters the reference force imparted to sensing element 252 and acts to alter the second force F2, allowing for adjustment of the setpoint pressure substantially maintained by PRV 251. In examples, reference force adjuster 256 can be manually adjusted by a user (e.g., using a compressor or a source of pressurized gas), and/or may be automatically adjusted by control circuitry 232 (e.g., using a compressor or a source of pressurized gas).

PRV 251 further includes valve position sensor 276 ("VPS 276") configured to generate a signal indicative of a position of restricting element 206 (e.g., relative to valve body 201). In the example depicted by FIG. 3, PRV 251 includes an extension stem 277 mechanically connected to restricting element 206 an extending through valve body 201. VPS 276 is configured to sense the position of restricting element 206 based on a position of extension stem 277. VPS 276 is configured to generate provide a signal indicative of the position of restricting element 206 to control circuitry 232 via a communication link (e.g., communication link 238 (FIG. 2)). Valve position sensor 244 is an example of valve position sensor 244, and extension stem 277 is an example of extension stem 245.

Figure 4:
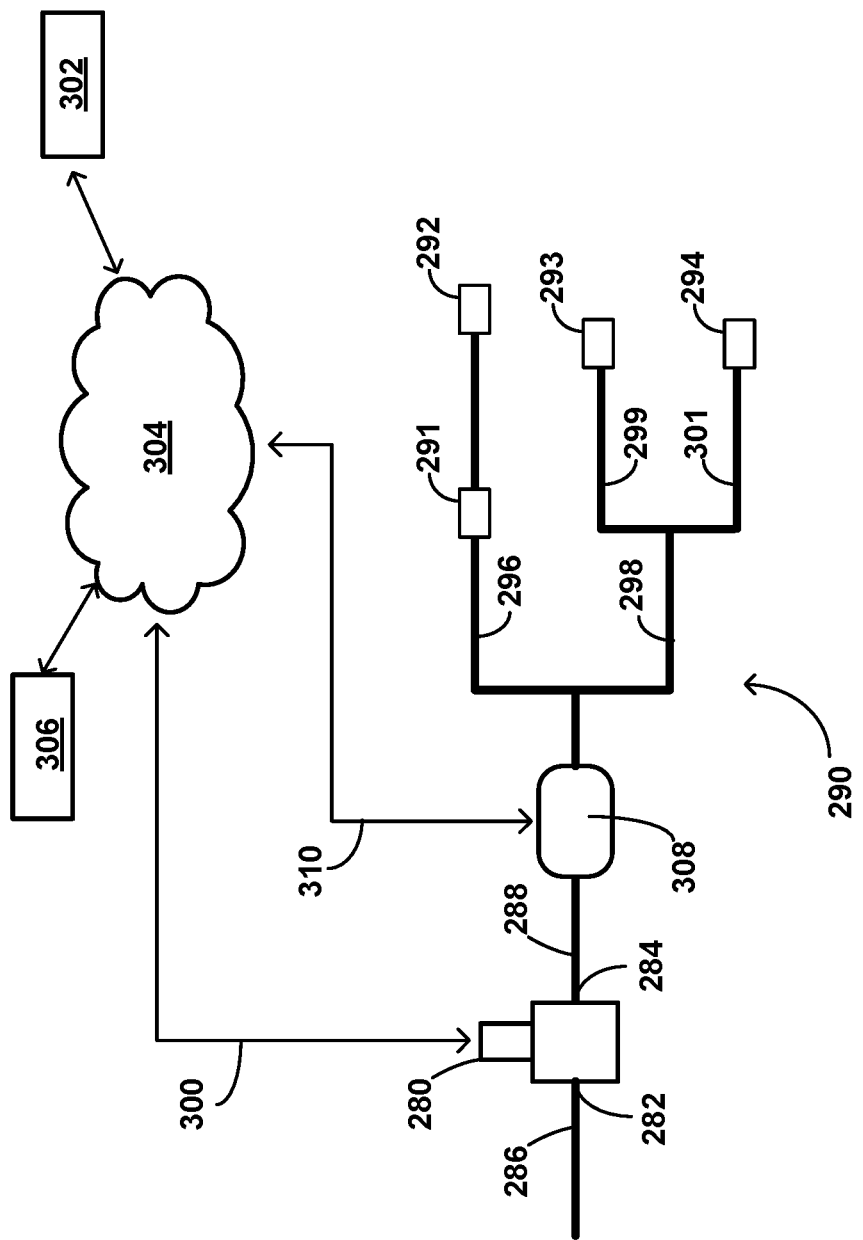
FIG. 4 is a conceptual diagram illustrating an example pressure regulating valve configured to communicate with a user device.

FIG. 4 illustrates an example system including an example PRV 280 configured to determine a quantity of flow (e.g., a volume) which has occurred over a time interval (e.g., seconds, minutes, hours, days, etc.) between PRV inlet of PRV 280 to a PRV outlet of PRV 280. PRV 280 is an example of PRV 110, PRV 124, PRV 136, PRV 138, PRV 140, PRV 142, PRV 200, and/or PRV 251. PRV 280 defined a flow path providing fluid from main branch 286 to secondary branch 288. Secondary branch 288 may be a water supply to a plumbing system 290 supplying one or more fluid loads, such as fluid load 291, fluid load 292, fluid load 293, and fluid load 294. Secondary branch 288 may be, for example, a residential water main and plumbing system 290 may be a residential plumbing system. PRV 280 is configured to determine a quantity of flow (e.g., a volume) consumed by plumbing system 290 (e.g., by fluid loads 291, 292, 293, 294) over a time interval (e.g., seconds, minutes, hours, days, etc.).

Fluid loads 291, 292, 293, 294 may be residential water loads such as a shower, bath, kitchen and/or bathroom faucet, dishwasher, washing machine, toilet, automatically refilling water tank, and the like. Fluid loads 291, 292, 293, 294 may be fluid loads which intermittently actuate (or are actuated), and may demand different flow rates depending on an operating condition of the fluid load (e.g., a particular type of dishwasher cycle, a degree to which a faucet is opened, etc.). Fluid loads 291, 292, 293, 294 may be hydraulically connected in series, in parallel, or in a combination of series and parallel. For example, within plumbing system 290, fluid load 291 and fluid load 292 are hydraulically connected in series to plumbing branch 296 while fluid load 293 and fluid load 294 are hydraulically connected in parallel to plumbing branch 298 (via branch 299 and branch 301 respectively).

PRV 280 includes a communication device (not illustrated in FIG. 4) configured to enable PRV 280 to communicate via a wired or wireless connection 300 to one or more user devices 302. The communication device may include a Bluetooth transmitter and receiver, a Wi-Fi transmitter and receiver, a Zigbee transceiver, a near-field communication transceiver, or other circuitry configured to allow PRV 280 to communicate with user device 302. In some examples, the communication device may allow PRV 280 to exchange data with user device 302. Examples of exchanged data include metering information (e.g., consumption of fluid by plumbing system 290 over a time interval), estimated costs of the metered flow, historical metering information (e.g., metered flow per day over a given week, etc.), error codes, and/or other operating parameters or system performance characteristics for plumbing system 290. In some examples, user device 302 may be configured to execute an application for controlling one or more parameters of PRV 280. As such, in some examples, control circuitry of PRV 280 is configured to receive information indicative of a user selection of a desired time interval, a desired history of metered flow, and other user inputs, and the control circuitry may provide information to user device 302 based on the information indicative of the user selection.

User device 302 may be, include, or otherwise be used in combination with a mobile phone, smartphone, tablet computer, personal computer, desktop computer, personal digital assistant, router, modem, remote server or cloud computing device, and/or related device allowing PRV 280 to communicate over a communication network such as, for example, the Internet or other wired or wireless connection. Communicating via the wired or wireless connection 300 may allow PRV 280 to be configured, controlled, or otherwise exchange data with user device 302. In some examples, PRV 280 communicating via wired or wireless connection 300 may allow a user to set up PRV 280 when first installing PRV 280 in plumbing system 290. In some examples, PRV 280 and user device 302 communicate through a wireless network device such as a router or a switch. In other examples, PRV 280 and user device 302 communicate through a wired connection such as an ethernet port, USB connection, or other wired communication network. Thus, a user can interact with PRV 280 via a user interface of a mobile phone, a tablet, a computer, or other device. For example, user device may communicate with PRV 280 via network 304.

PRV 280 may, via the communication device, communicate via wired or wireless connection 300 with an external computing system 306. External computing system 306 may be, for example, a database configured to record information from PRV 280, processing circuitry configured to receive and conduct analysis om information received from PRV 280, and the like. In some examples, wired or wireless connection 300 enables PRV 280 to communicate with external computing system 306 via a wireless connection which includes a network device such as a router, ethernet port, or switch. PRV 280 and external computing system 306 may also communicate through a wired connection such as an ethernet port, USB connection, or other wired communication network. Communicating via the wired or wireless connection 300 may allow PRV 280 (e.g., control circuitry of PRV 280) to exchange data with external computing system 306, such that external computing system 306 may be located remotely from PRV 280 and plumbing system 290. In some examples, external computing system 306 may be, include, or otherwise be used in combination with a remote server, cloud computing device, or network of controllers configured to communicate with each other.

PRV 280 may provide metering information to external computing system 306 in order to assist external computing system 306 in the monitoring of various operating parameters associated with plumbing system 290. For example, plumbing system 290 may include a communications enabled flow measurement device 308 configured to provide time-stamped volume-rate measurements of the fluid (e.g., water) entering plumbing system 290 via secondary branch 288, such as the BUOY Whole Home Water Controller available from Resideo Technologies. Flow measurement device 308 may be configured to provide the time-stamped volume-rate measurements to external computing system 306 via wired or wireless connection 310. External computing system 306 may be configured to analyze the time-stamped volume-rate measurements as a time-series of data in order to estimate which of fluid loads 291, 292, 293, and/or 294 were actuated at various points in the time-series of data.

In some examples, PRV 280 may provide metering information to external computing system 306 in order to increase an accuracy of the estimate, decrease computing time required by external computing system 306, serve as an input to a learning algorithm executed by external computing system 306, or other reasons. PRV 280 may be configured to provide metering information to external computing system 306 on a schedule requested by external computing system 306 or on-demand from external computing system 306. PRV 280 may be configured to provide a time-series of data to external computing system 306 based on formatting requirements received from external computing system 306 (e.g., provide metering for every 0.1 seconds over a designated time frame, provide metering for each day over the last week, and the like).

Figure 5:
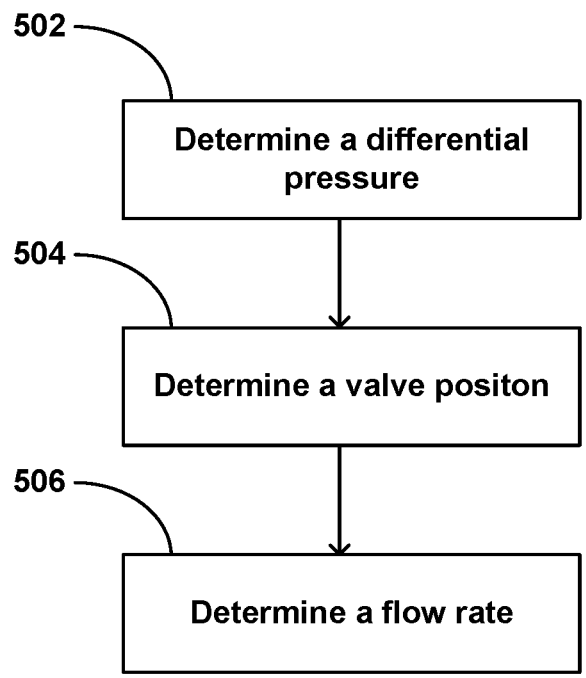
FIG. 5 is a flow diagram illustrating an example technique for controlling a pressure in a fluid circuit.

FIG. 5 illustrates a flow diagram of an example technique for determining a flow rate. Although the technique is mainly described with reference to PRV 200 (FIG. 2), PRV 251 (FIG. 3), and/or PRV 280 (FIG. 4), in other examples, the technique may be used with PRV 110, PRV 124, PRV 136, PRV 138, PRV 140, and/or PRV 142 of FIG. 1 or another PRV. In addition, control circuitry 116, 130, 232 alone or in combination with control circuitry of other devices can perform any part of the technique shown in FIG. 5

In accordance with the technique shown in FIG. 5, control circuitry 232 determines a differential pressure over a section of a flow path defined by a valve body 201 of PRV 200, 251, 280 (502). The flow path may be defined between PRV inlet 202 and PRV outlet 204 of PRV 200, 251, 280. For example, valve body 201 may define the flow path from PRV inlet 202, through flow area 210 between valve disc 214 and valve seat 216, and to PRV outlet 204.

In some examples, control circuitry 232 determines the differential pressure (502) by at least determining a pressure difference between an inlet pressure at a flow location upstream of restricting element 206 and an outlet pressure at a second flow location downstream of restricting element 206. In some examples, the inlet pressure is indicative of a pressure at PRV inlet 202 of PRV 200, 251 and the outlet pressure is indicative of a pressure at PRV outlet 204 of PRV 200, 251. For example, control circuitry 232 may receive, from sensor 240 (FIG. 2) an inlet pressure signal indicative of the inlet pressure, and receive from sensor 242 (FIG. 2), an outlet pressure signal indicative of the outlet pressure, and determine the differential pressure using the inlet pressure and the outlet pressure signals. As another example, control circuitry 232 can receive a signal generated by a differential pressure sensor (e.g., differential pressure sensor 134 (FIG. 1), the signal being indicative of the differential pressure, and determine the differential pressure (502) based on such a signal.

Control circuitry 232 determines a position of a restricting element 206 within the flow path defined valve body 201 of PRV 200, 251 (504). For example, control circuitry 232 can receive a signal indicative of the position of restricting element 206 generated by a valve position sensor (VPS) 244, 276 of PRV 200, 251. For example, the signal can be indicative of a position of valve stem 212, valve disc 214, sensing element 218, 252, extension stem 245, 277, and/or other components of PRV 200, 251 having a position which influences the position of restricting element 206.

Control circuitry 232 determines a flow rate based on the differential pressure and the position of restricting element 206 (506). For example, control circuitry 232 can determine the flow rate by at least evaluating an expression wherein the flowrate Q is proportional to the position of restricting element 206 and one or more of the differential pressure, the inlet pressure upstream of restricting element 206, and/or the outlet pressure down stream of restricting element 206. In some examples, control circuitry 232 selects an expression from among one or more expressions based on the values of the differential pressure, the inlet pressure upstream of restricting element 206, the outlet pressure downstream of restricting element 206, and/or the position of restricting element 206. As another example, control circuitry 232 determine the flow rate by at least using a look-up data set defining flow rates in an n-dimensional space having individual dimensions defined by the inlet pressure upstream of restricting element 206, the outlet pressure downstream of restricting element 206, the differential pressure, the position of restricting element 206, and/or combinations thereof.

In some examples, control circuitry 232 determines a flow volume over a time interval by at least integrating the flow rate over the interval. For example, control circuitry 232 can perform a numerical integration using discrete time intervals. Control circuitry 232 may provide an indication of the determined flow volume as an output, e.g., over a single discrete time interval (e.g., 0.1 seconds) or over multiple discrete time intervals (e.g., a total flow volume over a minute based on a series of flow rates determined at discrete time intervals less than a minute).

In some examples, control circuitry 232 communicates the determined flow volume, the determined flow rate, and/or other information to user device 302 (FIG. 4) using wired or wireless connection 300. User device 302 may also communicate information to control circuitry 232. In either example, the communicated information can include, for example, metering information, estimated costs of the metered flow, historical metering information, error codes, and/or other operating parameters or system performance characteristics of a fluid system (e.g., plumbing system 290) monitored by PRV 280.

In some examples, control circuitry 232 communicates with external computing system 306, e.g., to transmit metering information determined by PRV 280 to system 306. Processing circuitry of external computing system 306 may determine various operating parameters of a fluid system (e.g., plumbing system 290) using flow measurement device 308 and the information from PRV 280. For example, the processing circuitry may use information (e.g., metering information) from PRV 280 as an input to a learning algorithm executed by external computing system 306. PRV 280 can provide the information to external computing system 306 on a schedule requested by external computing system 306 or on-demand from external computing system 306.

The techniques described in this disclosure, including those attributed to control circuitry 116 (FIG. 1), control circuitry 232 (FIG. 2), other control circuitry, processing circuitry, sensors, or various constituent components, may be implemented, at least in part, in hardware, software, firmware or any combination thereof. For example, various aspects of the techniques may be implemented within one or more processors, including one or more microprocessors, DSPs, ASICs, FPGAs. or any other equivalent integrated or discrete logic circuitry, as well as any combinations of such components, embodied in any suitable device. Processing circuitry, control circuitry, and sensing circuitry, as well as other processors, controllers, and sensors described herein, may be implemented at least in part as, or include, one or more executable applications, application modules, libraries, classes, methods, objects, routines, subroutines, firmware, and/or embedded code, for example. In addition, analog circuits, components and circuit elements may be employed to construct one, some or all of the control circuitry and sensors, instead of or in addition to the partially or wholly digital hardware and/or software described herein. Accordingly, analog or digital hardware may be employed, or a combination of the two.

In one or more examples, the functions described in this disclosure may be implemented in hardware, software, firmware, or any combination thereof. If implemented in software, the functions may be stored on, as one or more instructions or code, a computer-readable medium and executed by a hardware-based processing unit. The computer-readable medium may be an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), erasable programmable ROM (EPROM), electronically erasable programmable ROM (EEPROM), flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache).

The functionality described herein may be provided within dedicated hardware and/or software modules. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components. Also, the techniques could be fully implemented in one or more circuits or logic elements.

The present disclosure includes the following examples.

Example 1: A valve comprising: a valve body defining a defining a flow path; a restricting element within the flow path; a sensing element configured to modify a position of the restricting element, wherein the sensing element defines a first area in fluid communication with the flow path and a second area fluidly isolated from the flow path; and control circuitry configured to: determine a differential pressure over a section of the flow path, determine the position of the restricting element, and determine a flow rate based on the differential pressure and the position of the restricting element.

Example 2: The valve of example 1, further comprising: a valve inlet in fluid communication with the valve body; and a valve outlet in fluid communication with the valve body, wherein valve body defines the flow path from the valve inlet to the valve outlet, and wherein the restricting element is within the flow path between the valve inlet and the valve outlet.

Example 3: The valve of example 2, wherein the first area is in fluid communication with a flow section of the flow path, and wherein the restricting element is between the flow section and the valve inlet.

Example 4: The valve of any combination of examples 2-3, further comprising: an inlet pressure sensor configured to generate an inlet pressure signal indicative of a pressure at the valve inlet; and an outlet pressure sensor configured to generate an outlet pressure signal indicative of a pressure at the valve outlet, wherein the control circuitry is configured to determine the differential pressure based on the inlet pressure signal and the outlet pressure signal.

Example 5: The valve of any combination of examples 1-4, wherein the control circuitry is configured to determine a volume of fluid flow through the valve body by at least integrating the flow rate over a period time.

Example 6: The valve of any combination of examples 1-5, further comprising a valve position sensor configured to generate a position signal indicative of the position of the restricting element, wherein the control circuitry is configured to determine the position of the restricting element based on the position signal.

Example 7: The valve of any combination of examples 1-6, wherein the valve body defines the flow path through a flow area between the valve body and the restricting element, and wherein the sensing element is configured to alter the flow area in response to a change in the force on the second area defined by the sensing element.

Example 8: The valve of any combination of examples 1-7, wherein the sensing element is operatively coupled to the valve body.

Example 9: The valve of any combination of examples 1-8, wherein the sensing element is configured to move in a first direction in response to a first force on the first area and configured to move in a second direction in response to a second force opposite the first force.

Example 10: The valve of example 9, wherein the valve body is configured to cause the flow path to exert the first force on the first area.

Example 11: The valve of any combination of examples 9-10, wherein the sensing element is configured to move in the second direction in response to the second force on the second area.

Example 12: The valve of any combination of examples 9-11, further comprising a reference force element configured to exert the second force.

Example 13: The valve of example 12, further comprising a reference force adjuster configured to increase or decrease the second force exerted by the reference force element.

Example 14: A valve comprising: a valve body defining a defining a flow path, a restricting element within the flow path; a sensing element operatively connected to the valve body, wherein the sensing element is configured to: move the restricting element in a first direction in response to a force on a first area of the sensing element, wherein the first area is in fluid communication with the flow path, and move the restricting element in a second direction different from the first direction in response to a force on a second area of the sensing element, wherein the second area is fluidly isolated from the flow path; and a control circuitry configured to: determine a differential pressure over a section of the flow path, determine a position of the restricting element, and determine a flow rate using the differential pressure and the position of the restricting element.

Example 15: The valve of example 14, wherein the valve body is configured to cause a fluid in the flow path to exert the force on the first area.

Example 16: The valve of any combination of examples 14-15, further comprising a spring configured to exert the force on the second area.

Example 17: The valve of any combination of examples 14-16, further comprising: a valve inlet in fluid communication with the valve body; a valve outlet in fluid communication with the valve body, wherein valve body defines the flow path from the valve inlet to the valve outlet, and wherein the restricting element is within the flow path between the valve inlet and the valve outlet; an inlet pressure sensor configured to generate an inlet pressure signal indicative of a pressure at the valve inlet; an outlet pressure sensor configured to generate an outlet pressure signal indicative of a pressure at the valve outlet, wherein the control circuitry is configured to determine the differential pressure based on the inlet pressure signal and the outlet pressure signal; and a valve position sensor configured to generate a position signal indicative of the position of the restricting element, wherein the control circuitry is configured to determine the position of the restricting element based on the position signal.

Example 18: A method comprising: determining, by control circuitry, a differential pressure over a section of a flow path defined by a valve body of a valve; determining, by the control circuitry, a position of a restricting element of the valve, the restricting element being within the flow path, wherein the valve further comprises a sensing element configured to modify the position of the restricting element, wherein the sensing element defines a first area in fluid communication with the flow path and a second area fluidly isolated from the flow path; and determining, by the control circuitry, a flow rate based on the differential pressure and the position of the restricting element.

Example 19: The method of example 18, further comprising receiving, by the control circuitry, an inlet pressure signal generated by an inlet pressure sensor in fluid communication with the flow path upstream of the restricting element; and receiving, by the control circuitry, an outlet pressure signal generated by an outlet pressure sensor in fluid communication with the flow path downstream of the restricting element, wherein determining the differential pressure over the section of the flow path comprises determining, by the control circuitry, the differential pressure based on the inlet pressure signal and the outlet pressure signal.

Example 20: The method of any combination of examples 19-20, further comprising: receiving, by the control circuitry, a position signal from a valve position sensor, wherein the position signal is indicative of the position of the restricting element, wherein determining the position of the restricting element comprises determining, by the control circuitry, the position of the restricting element based on the position signal.

Various examples have been described. These and other examples are within the scope of the following claims.

What is claimed is:
1. A system comprising:
a plurality of pressure regulating valves, each pressure regulating valve of the plurality of pressure regulating valves being associated with a fluid load of a fluid circuit, and each pressure regulating valve of the plurality of pressure regulating values comprises:
  a valve body defining a flow path for water;
  a restricting element within the flow path;
  a sensing element defining an area in fluid communication with the flow path, wherein the sensing element is configured to position the restricting element based on a pressure of the water within the flow path acting on the area; and
  control circuitry configured to:
    determine a differential pressure over a section of the flow path,
    determine the position of the restricting element, and
    determine a water flow rate based on the differential pressure and the position of the restricting element; and
a processing device in communication with the plurality of pressure regulating valves and configured to:
  receive, from each pressure regulating valve of the plurality of pressure regulating valves, metering information; and
  determine based on the metering information that a certain fluid load associated with one of the plurality of pressure regulating valves was actuated.

2. The system of claim 1, wherein each pressure regulating valve of the plurality of pressure regulating values further comprises:
a valve inlet in fluid communication with the valve body; and
a valve outlet in fluid communication with the valve body, wherein the valve body defines the flow path from the valve inlet to the valve outlet, and wherein the restricting element is within the flow path between the valve inlet and the valve outlet, wherein the pressure of the water within the flow path acting on the area comprises a pressure downstream of the restricting element.

3. The system of claim 2, wherein the area is configured to receive a pressure force caused by the pressure of the water, wherein the sensing element is configured to position the restricting element based on the pressure force.

4. The system of claim 2, wherein each pressure regulating valve of the plurality of pressure regulating values further comprises:
an inlet pressure sensor configured to generate an inlet pressure signal indicative of a pressure at the valve inlet; and
an outlet pressure sensor configured to generate an outlet pressure signal indicative of a pressure at the valve outlet,
wherein the control circuitry is configured to determine the differential pressure based on the inlet pressure signal and the outlet pressure signal.

5. The system of claim 1, wherein the control circuitry is configured to determine a volume of water flow through the valve body by at least integrating the flow rate over a period time.

6. The system of claim 1, wherein each pressure regulating valve of the plurality of pressure regulating values further comprises a valve position sensor configured to generate a position signal indicative of the position of the restricting element, wherein the control circuitry is configured to determine the position of the restricting element based on the position signal.

7. The system of claim 1, wherein the valve body defines the flow path through a flow area between the valve body and the restricting element, and wherein the sensing element is configured to alter the flow area in response to a change in the pressure of the water.

8. The system of claim 1, wherein the sensing element is operatively coupled to the valve body.

9. The system of claim 1, wherein the sensing element is configured to move in a first direction in response to a first force exerted by the pressure of the water and configured to move in a second direction in response to a second force opposite the first force.

10. The system of claim 9, wherein the valve body is configured to cause the pressure of the water in the flow path to exert the first force on the area.

11. The system of claim 9, wherein each pressure regulating valve of the plurality of pressure regulating values further comprises a reference force element configured to exert the second force.

12. The system of claim 11, wherein each pressure regulating valve of the plurality of pressure regulating values further comprises a reference force adjuster configured to increase or decrease the second force exerted by the reference force element.

13. The system of claim 1, wherein the processing device comprises one of an external computing system or a user device.

14. The system of claim 11, wherein the reference force element includes at least one of a dome chamber configured to cause a gas within the dome chamber to exert the second force on the sensing element, or a spring configured to exert the second force on the sensing element.

15. The system of claim 1, wherein the metering information includes at least one volume-rate measurement with an associated time stamp.

16. The system of claim 1, further comprising:
a flow measurement device configured to:
measure a flow entering the fluid circuit; and
transmit to the processing device data indicating the measured flow entering the fluid circuit,
wherein the processing device is configured to determine based on the metering information that the certain fluid load associated with one of the plurality of pressure regulating valves was actuated based on first time stamps associated with the metering information and second time stamps associated with the data indicating the measured flow entering the fluid circuit.

17. The system of claim 1, wherein each pressure regulating valve of the plurality of pressure regulating values is associated with a different branch of the fluid circuit.

18. The system of claim 1, wherein one of the fluid loads of the fluid circuit comprises a dishwasher.

19. The system of claim 1, wherein one of the fluid loads of the fluid circuit comprises a washing machine.

20. The system of claim 1, wherein one of the fluid loads of the fluid circuit comprises a shower.

* * * * *